Dec. 14, 1965 S. B. ROBBINS 3,223,377
MEMORY SYSTEM FOR POWERED SEAT
Filed May 13, 1963 3 Sheets-Sheet 1

INVENTOR.
Samuel Bartlett Robbins
BY
Robert L. Spencer
ATTORNEY

INVENTOR.
Samuel Bartlett Robbins
BY Robert L. Spencer
ATTORNEY

United States Patent Office 3,223,377
Patented Dec. 14, 1965

3,223,377
MEMORY SYSTEM FOR POWERED SEAT
Samuel Bartlett Robbins, Rochester, Mich., assignor to General Motors Corporation, Detroit, Mich., a corporation of Delaware
Filed May 13, 1963, Ser. No. 279,933
7 Claims. (Cl. 248—419)

This invention relates to seat adjusting apparatus and more particularly to an automatic control for a power operated vehicle seat adjusting apparatus which will automatically return the seat to preset favorite positions upon actuation of the appropriate controls.

Most family automobiles have two or more drivers and generally each driver has a different favorite position for the seat. Consequently, each driver alters the seat adjustment to his favorite position from the previous driver's selected position. Such altering generally requires several adjustments until the desired favorite position is obtained. It is an object of this invention to provide an automatic seat control unit for the seat adjusting apparatus which may be actuated to automatically position the seat to a previously selected favorite position.

Power vehicle seat adjusters are generally available in models providing adjustment in the horizontal and/or vertical directions. The present arrangement shown and described is illustrated as being applied to automatic controls for a horizontal adjusting unit but may equally well be applied to provide automatic controls for an adjuster having a vertical adjusting unit.

Due to critical space limitations beneath automobile seats, it is common practice to use flexible cables as torque transmitting elements. The present invention is particularly adapted for use in connection with such flexible cables or other torque transmitting elements as may be employed, such as for example rigid shafts, but is not necessarily limited to a flexible cable arrangement.

The invention provides an automatic control or memory unit responsive to rotation of a rotative torque transmitting element for limiting the rotation of said element to automatically stop rotation thereof when the seat returns to a desired preselected favorite seat position.

A further feature of this invention is the provision of a memory unit for an adjuster unit responsive to the drive of a reversible electric motor and incorporating engageable and releaseable clutch mechanisms for establishing a memory position for the adjuster unit.

An additional object of this invention is to provide a memory unit incorporating a clutch actuated switch means effective when the clutch is engaged to automatically preset an electrical circuit for return of the seat to its preselected favorite position.

Another object of this invention is to provide in a memory circuit control system, of the class described, manually operable means for disconnecting the memory circuits to enable the seat position to be changed to a position other than the favorite position and still retain the favorite position setting in the memory unit in order that the seat may subsequently, on command, be automatically returned to such favorite position.

A further object of this invention is to provide a self contained memory unit including a housing having a rotatable member driven by the torque transmitting member and having a pair of spaced friction faces and axially movable clutch plates adapted to be engaged to and released from the friction faces in order to change the favorite position of the seat from a previously selected favorite position to a new favorite position, and wherein rotation of the rotatable member with the clutch plates engaged thereto will preset electrical circuits for automatic return to the selected favorite position upon command.

An additional object of this invention is to provide means for enabling the operator to change his favorite preselected position from a first favorite position to a second favorite position at will.

A further object is to provide an electric control system effective to release the clutch plate from the rotatable member and simultaneously drive the seat to new favorite position with the clutch disengaged in order to set up a new favorite position in the memory unit.

A more specific object of this invention is to provide a memory unit having a housing having a rotatable member rotatably supported therein wherein clutch plates are adapted to be engaged to and released from the rotatable member and to provide pawl means cooperable with actuating means on the clutch plates to actuate motor field winding control switches to control the direction of rotation of a motor connected to drive the rotatable means and wherein the field circuit control switch actuated will be determined by the direction of rotation of the rotatable member.

Another object of this invention is to provide in a control system, of the class described, a first and second manually operable control system wherein the seat may be automatically returned from a non-favorite to a favorite position simply by closing one of the switches, wherein a new favorite selected position may be set up by closing both of the switches at the same time, and wherein the seat may be moved from a favorite position to a non-favorite position without upsetting the favorite preset position by opening one of the switches and closing the other of the switches.

A further object of this invention is to provide an automatic limit control for an adjuster unit responsive to rotation of a rotative torque transmitting element for limiting the travel of the adjuster unit by limiting the rotation of said element to automatically stop rotation thereof when the adjuster has traveled to the extremes of its preselected limits.

These and other objects will become more apparent as reference is had to the accompanying drawings and specification wherein.

Figure 1:
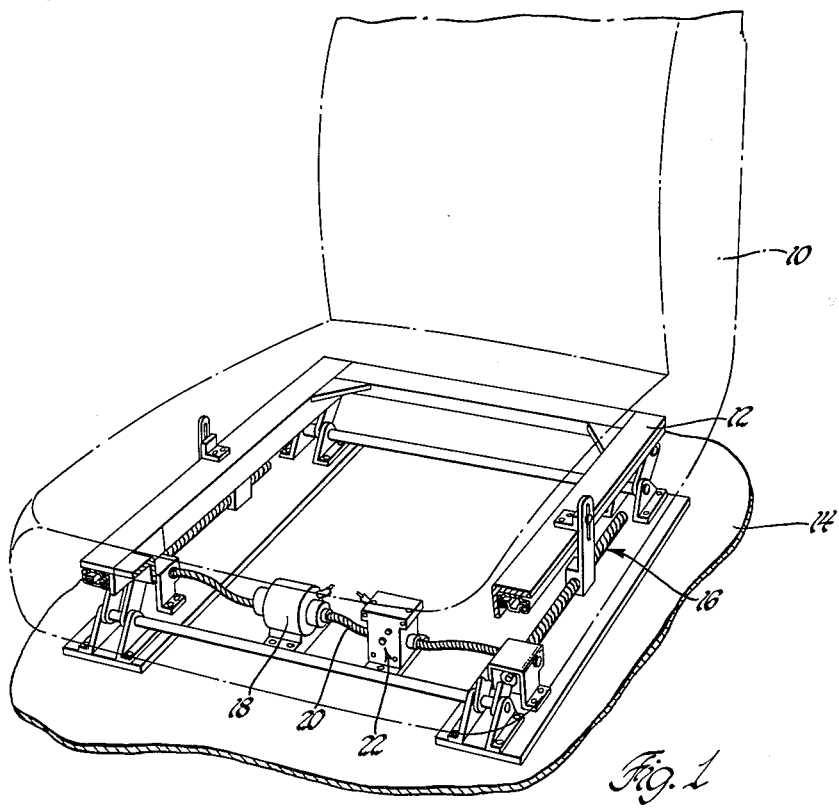
FIGURE 1 is a perspective view of an electrically powered horizontal seat adjuster mechanism utilizing the present invention, with parts in section and cut away, and showing a seat, in phantom lines, mounted thereon.

Referring now to the drawings, in FIGURE 1, a vehicle seat 10, shown in phantom lines, is mounted on a seat frame 12 and supported on a platform or vehicle floor 14 by a conventionl horizontal powered seat adjuster mechanism indicated generally by numeral 16 of the type disclosed in Lohr et al. Patent No. 2,964,093. A reversible electric motor 18 transmits torque through a drive element such as a flexible cable 20 to the seat adjuster 16. An automatic control or memory unit 22 is driven by cable 20 by means best shown in FIGURES 3 through 5. The memory unit 22 is adapted to control an electrical circuit between a power source, such as a battery 24, and the electric motor 18, as best seen in the schematic wiring diagram of FIGURE 6.

Figure 2:
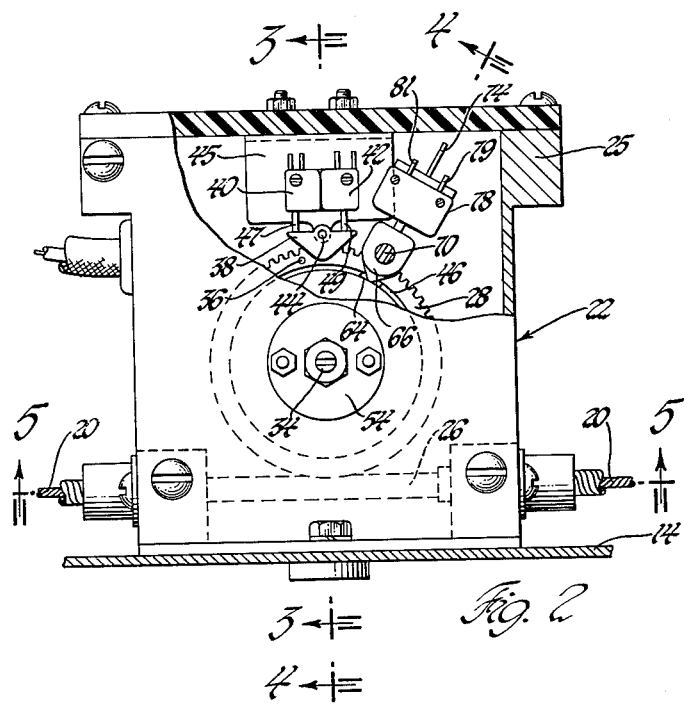
FIGURE 2 is a front view of the automatic control unit, with parts cut away and in section, to show the limit switches and a field control switch.
Figure 3:
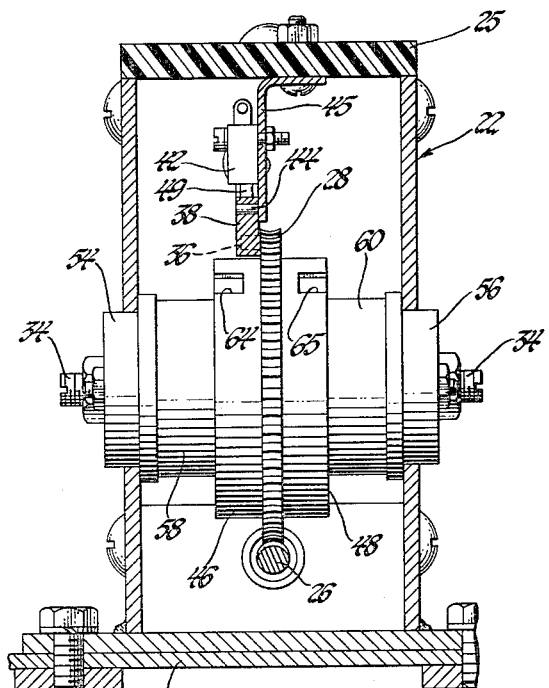
FIGURE 3 is a sectional view taken substantially along the line 3—3 of FIGURE 2 showing the position of the worm and worm gear, clutch plates engaging the worm gear and the limit switches adjacent the worm gear.
Figure 4:
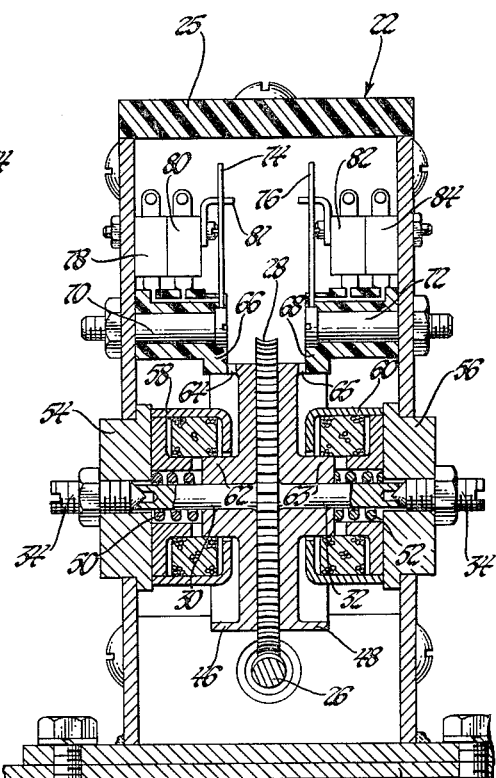
FIGURE 4 is a view taken substantially along the line 4—4 of FIGURE 2 illustrating the field control pawls in neutral positions in the clutch plate slots and the solenoids de-energized, with the compression springs holding the clutch plates against the worm gear.
Figure 5:
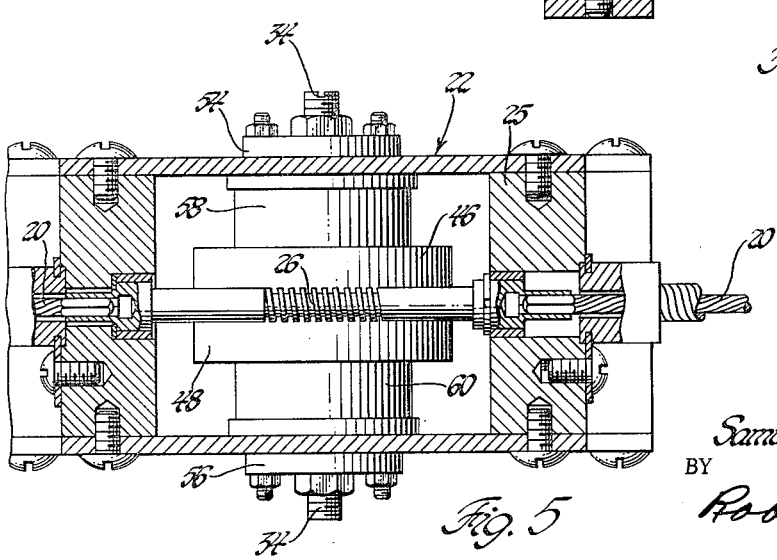
FIGURE 5 is a view taken substantially along the line 5—5 of FIGURE 2 and illustrates the manner in which the worm is journalled in the housing and joined to the flexible drive cable.

Referring now to FIGURES 2 through 6, the memory unit 22 is shown as having a housing 25 rigidly secured to the platform 14 by suitable means. As best seen in FIGURE 5, a worm 26 is journalled in the housing 25 and is connected in series with the cable element 20 for rotative movement therewith. Meshing with a worm 26 is a rotatable member comprising a worm gear 28, as shown in FIGURE 4, which is formed with shafts 30, 32 extending from its center for rotatably supporting the worm gear in two cone shaped bearing pins 34 mounted in the housing 25.

Since the worm 26 rotates as the flexible cable 20 rotates, the gear ratio of worm 26 to worm gear 28, in the illustrated embodiment, is such that the number of rotations of flexible cable 20 required to move the seat from its extreme forward position to its extreme rearward position of adjustment is less than the number of rotations of the worm required to rotate the worm gear 360°. In this mechanism, 188 turns of the cable are required to move the seat adjuster between its extreme limits of adjustment and the ratio of worm gear is 1 to 200. As shown in FIGURES 2 and 3, a pin 36 is secured to a face of worm gear 28 near the outer periphery and is positioned so that it will contact a limit switch actuator 38 during rotation of the gear in either direction. Such contacting actuates one or the other of the normally closed limit switches 40, 42 to an open position depending upon direction of rotation of member 28. In some cases two pins such as pins 36 may be required if the full travel of the adjuster unit does not require 360° rotation of the worm gear 28. As best seen in FIGURE 2, the limit switch actuator 38 is pivotally supported on a pivot pin 44 carried by a support frame 45 bolted to housing 25 and is biased to a neutral position by the spring action of plungers 47 and 49 of the switches 40 and 42, respectively, bearing on the actuator at opposite sides of pivot pin 44. The pin 36 carried by worm gear 28 contacts the limit switch actuator 38 during rotation of the worm gear 28 and depending upon the direction of rotation of the worm gear, the actuator 38 is pivoted to the right or left, thus opening switch 40 or 42.

Two movable members or clutch plates 46, 48 are mounted on shafts 30, 32, respectively, of the worm gear 28, being free to slide axially thereon into and out of engagement with the worm gear and to rotate freely on said shafts when not engaged with said worm gear. Compression springs 50, 52 are positioned about shafts 30, 32, respectively, and are seated against inserts 54, 56 secured to and forming a portion of housing 25, and normally urge clutch plates 46, 48 into engagement with worm gear 28 for rotation therewith. Solenoids 58, 60 are secured to inserts 54, 56, respectively, and are positioned about hub portions 62, 63 of the respective clutch plates 46, 48 so that when the adjacent solenoid is energized, the respective clutch plate is moved from engagement with worm gear 28, overcoming the force of the respective compression spring, and allowing the worm gear to be rotated without moving the disengaged clutch plate.

As can best be seen in FIGURES 2 and 4, slots 64, 65 are formed in the outer periphery of clutch plates 46, 48, respectively, to receive control pawls 66, 68 which are rotatably secured to the housing 25 by their respective pivot bolts 70, 72. Each of the control pawls 66, 68 has its respective switch blade 74, 76 secured thereto. When the pawls are in their appropriate slot in the clutch plate, the switch blade associated therewith is in a neutral position between a pair of normally open field control switches 78, 80 for blade 74 and 82, 84 for blade 76.

In the event that worm gear 28 is rotated clockwise with clutch plate 46 engaged thereto, pawl 66 will pivot counterclockwise from slot 64 to position blade 74 to mechanically touch an electrical contact 81 of switch 80 to complete an electrical circuit through switch 80. If the worm gear is rotated counterclockwise, pawl 66 will pivot clockwise from slot 64 to position blade 74 to complete an electrical circuit through contact 79 of field control switch 78. Switches 82 and 84 operate in similar manner in response to rotation of switch blade 76 by pawl 68.

In the memory unit 22, rotation of the worm gear 28 when the clutch plates 46, 48 are engaged therewith will swing the blades 74, 76 into contact with one of their field control switches and will preset circuits to control the direction of rotation of the electric motor 18.

Within the limits of movement of seat adjuster 16 controlled by pin 36 and the conventional normally closed limit switches 40, 42, respectively, a manually operable direction switch 86 (see FIGURE 6) may be pivoted to contact forward terminal 88 or reverse terminal 90 to energize the forward field winding 92 or reverse field winding 94, respectively, of the motor 18 for either forward or reverse movement of the seat.

Figure 6:
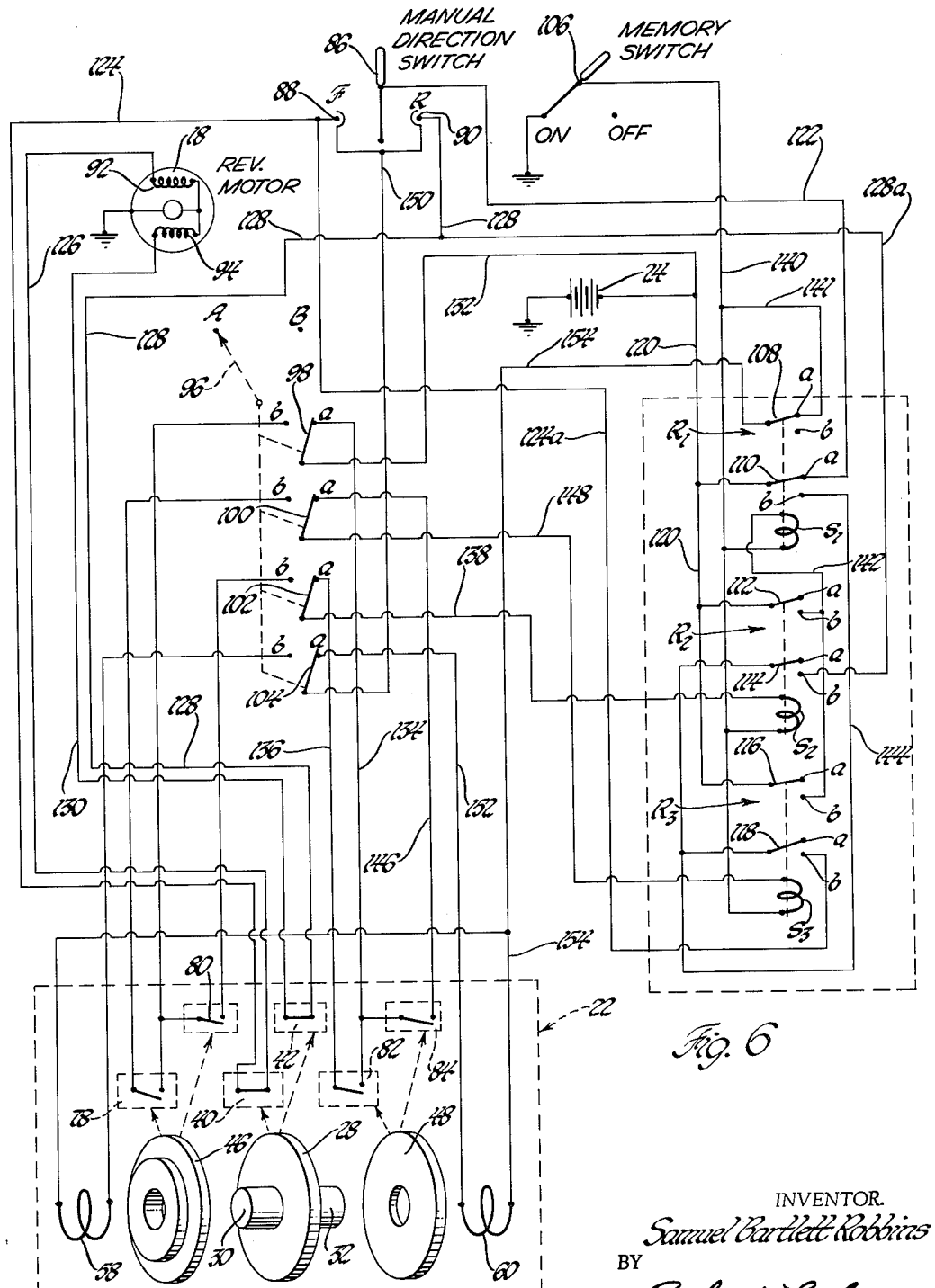
FIGURE 6 is a schematic diagram of the electrical control circuit for the memory units and seat adjuster.

Referring to FIGURE 6, the memory unit 22 provides means whereby two favorite seat positions A and B may be established to automatically control the flow of power to the electric motor 18 from battery 24 and thereby move the seat adjuster mechanism 16 and return the seat 10 to either favorite position A or favorite position B. The electrical harness and switches associated with the memory unit 22 for such control includes a manually operable selector switch 96 movable to positions A or B and by such movement controlling gang switches 98, 100, 102 and 104 which move in unison with switch 96 between their respective terminals a and b. When selector switch 96 is in A position, the gang switches are connected to their a terminals and conversely when switch 96 is at B to their b terminals. With the selector switch in A position, solenoid 60 is connected to the manual direction switch 86 and the memory switch 106 and the field control switches 82, 84 are connected to the battery 24 and through three relays R-1, R-2 and R-3 to the forward field winding 92 and reverse field winding 94. The three relays R-1, R-2 and R-3 each have two switches controlled by solenoids S-1, S-2 and S-3, respectively. Relay R-1 includes switches 108 and 110, relay R-2 includes switches 112 and 114 and relay R-3 includes switches 116 and 118. Each switch in the relays has a movable contact connected to a single common relay armature and is movable thereby between two fixed terminals a and b. The movable contacts are normally connected to fixed terminals a when the relay solenoids are not energized and are moved to the fixed terminals b when the relay solenoids are energized.

OPERATION

With the memory switch 106 "OFF," the manual direction switch 86 controls the flow of power from the battery 24 to the motor 18 as a conventional seat adjuster direction switch. With the manual switch 86 positioned for forward seat movement, the forward field winding 92 of motor 18 will be energized to cause the motor to drive cable 20 for forward seat motion. Power is supplied from battery 24 by way of lead 120 through a switch 110-a of relay R-1, lead 122 through switch 86 to lead 124, through limit switch 40 to lead 126 to forward field winding 92 of motor 18.

With switch 86 positioned for reverse seat movement, reverse field winding 94 is energized by way of lead 120, through switch 110-a of relay R-1, lead 122, through switch 86, to lead 128, through limit switches 42 and lead 130. Thus, the motor 18 may be selectively driven in either forward or reverse at the option of the operator.

In the event that gear 28 has been rotated to a position wherein pin 36, carried by gear 28, contacts limit switch actuator 38, one or the other of limit switches 40, 42 will be opened, depending upon the direction of rotation of the gear to automatically protect the motor when the limit of motion of the seat adjuster in either direction is achieved.

The memory unit 22 is arranged to provide means whereby two favorite comfortable positions A and B may be set in the unit for automatic return thereto at the choice of the operator from a non-favorite position of the seat.

The manually operable selector switch 96 may be moved to either position A or B to cause the seat adjuster mechanism to automatically move the seat to a position corresponding to either favorite position A or favorite position B, as selected. In order to actuate the automatic return to the favorite selected A or B position, the manually operable memory switch 106 must be positioned in its "ON" or closed position, as shown in FIGURE 6. When the memory switch is moved to "ON" position, the solenoids 58 and 60 of the memory unit and the solenoids S–1, S–2 and S–3 of the relays R–1, R–2 and R–3, respectively, are all grounded and the automatic control unit 22 becomes activated.

With switch 96 positioned to selected favorite position A and with memory switch 106 closed or in its "ON" position, gang switches 98, 100 102, 104 mechanically controlled by switch 96 will move to contact their fixed *a* terminals. If the seat has previously been moved out of its favorite A position the seat will now automatically be returned to such position.

If the seat was previously moved forward from its favorite A position, field control switch 82 will have been closed by rotation of pawl 68 in its movement from slot 65 in response to rotation of clutch plate 48 with worm gear 28. Power flows from battery 24 through lead 132, to switch 98–*a* through lead 134, to switch 82, through lead 136, to gang switch 102–*a*, through lead 138 to solenoid S–2, the solenoid S–2 being grounded through lead 140 and switch 106 such that solenoid S–2 is energized. With solenoid S–2 energized, the armature of relay R–2 moves switches 112 and 114 to contact their *b* terminals. Power then flows from battery 24 through lead 120, through relay R–T's contact 112–*b*, through leads 142 to energize solenoid S–1 which is grounded by lead 140 and switch 106. With solenoid S–1 energized, the armature of relay R–1 moves switches 108 and 110 to contact their *b* terminals. Power now flows from battery 24 through lead 120, through relay switch 110–*b*, through lead 144 and through switch 114–*b* of relay R–2, through lead 128*a* and lead 128, through the closed limit switch 142, lead 130 to the reverse field winding 94 energizing the motor to move the seat to the rear. When the seat reaches its preselected favorite A position, switch 82 is opened by the movement of pawl 68 into slot 65 of clutch plate 48, opening switch 82 and thus cutting off the power from battery 24.

In the event that the seat has previously been moved rearwardly from its preselected favorite A position, the power flow is the same as previously described to lead 134. Switch 84 rather than switch 82 will have been closed by the rotation of clutch plate 48 in engagement with worm gear 28 through action of control pawl 68 being moved from control slot 65 in the periphery of clutch plate 48. Power will flow through field control switch 84 to lead 146, through gang switch 100–*a*, lead 148, to solenoid S–3 of relay R–3 which is grounded through lead 140 and switch 106. With solenoid S–3 energized, the armature of relay R–3 moves switches 116 and 118 to their *b* contacts. Power now flows from battery 24, through lead 120, switch 116–*b*, lead 142, to energize solenoid S–1 which is grounded through lead 140 and memory switch 106. Solenoid S–1, when energized, moves armature of relay R–1 to move switches 108 and 110 to contact their *b* terminals. Power now flows from battery 24, through lead 120, switch 110–*b*, lead 144, through switch 118–*b*, lead 124*a*, lead 124, to limit switch 40, lead 126, to forward field winding 92 energizing the motor 18 to drive the seat adjuster in a forward direction until the seat reaches its favorite A position, at which time field control pawl 68 rotates into slot 65 of clutch plate 48, thus opening field control switch 84 and cutting off the power.

To establish a new favorite or comfortable position for A in the memory unit 22, the selector switch 96 is turned to A and the memory switch 106 is turned to "ON" position (as shown in FIGURE 6). If the seat has been moved from the previous favorite setting of A, as previously explained, the memory unit automatically returns the seat to the favorite A position upon actuation of the preset circuits by turning the memory switch to "ON." With the seat returned to the favorite A position, the manual direction switch 86 is moved to the F terminal 88 or R terminal 90 and the seat is driven to the new position for A. When the switch 86 is moved to one of the terminals 88 or 90, the current flows from the battery 24 along lead 120, through switch 110–*a*, along lead 122, to the manual direction switch 86, then to the selected field winding 92 or 94 and armature of the motor 18 energizing the motor and moving the seat, as previously explained. Closing switch 86 also completes a circuit in the memory unit wherein the current flows from manual switch 86 along lead 150, through gang switch 104–*a*, along lead 152 to energize solenoid 60 which is grounded by lead 154, to switch 108–*a*, through lead 141, to memory switch 106. When solenoid 60 is energized, the force of compression spring 52 is overcome by the solenoid and the clutch plate 48 slides on arm 32 from engagement with worm gear 28 and is fixedly held by the solenoid while shaft 32 rotates freely in the clutch plate during rotation of the worm gear 28 as the seat is adjusted. When the new position for A is reached, the manual switch 86 is released and returns to its neutral position opening the circuit between the battery and the motor and de-energizing solenoid 60. Since the seat was in the favorite position for A before readjustment, the field control pawl 68 was in slot 65 of clutch plate 48 and blade 76 was in neutral position between field control switches 82, 84. Such conditions were not disturbed because the clutch plate was not rotated; thus, when clutch plate 48 is returned to contact with worm gear 28, the new position for A is automatically set into the memory unit.

It will readily be understood that in the event that gang switch 96 is moved to select the favorite B rather than favorite A position, the switches 98, 100, 102 and 104 will be moved to close the *b* rather than the *a* terminals. In this event the field control switches 78 and 80, controlled by clutch plate 46 and field control pawl 66 and slot 64 and blade 74, will be effective to control the operative forward or reverse field winding of the motor 18 depending upon whether the seat has been moved forwardly or rearwardly from favorite B position. The switch 80 corresponds to switch 82 and the switch 78 corresponds to the switch 84. The circuits operate in the manner previously described and need not be described in further detail.

While the preferred embodiments of the present invention have been shown and described herein, it is obvious that many structural details may be changed without departing from the spirit and scope of the following claims.

I claim:

1. A power seat adjuster for controlling the position of a vehicle seat comprising in combination, seat adjusting mechanism effective when actuated for changing the seat position, a reversible electric motor, a flexible drive cable operatively interconnecting said motor to said seat adjusting mechanism for driving said mechanism, means for controlling energization of said motor including switch mechanism directly actuated in response to movement of said flexible drive cable and effective to de-energize said motor upon movement of said seat to a preselected seat position, and manually operable switch means for energizing said motor to drive said seat adjusting mechanism toward said preselected seat position.

2. An automatic control means for controlling the motor of a seat adjusting apparatus for selectively positioning a vehicle seat in a favorite position comprising; a housing, a first member rotatably mounted in said housing for rotational movement as the seat position is adjusted, a second member rotatably mounted in said housing axially spaced adjacent said first member and being axially movable into and from engagement with said first member and being movable therewith when so engaged, a favorite position switching means including a circuit for controlling the direction of rotation of said motor, a pair of field control switches secured on said housing adjacent said second member and being controlled by the movement of said second member for presetting said circuit for controlling the direction and amount of rotation of said motor for return to the preset favorite position, and means for effectively connecting and disconnecting said switching means to said motor.

3. In combination with seat adjusting apparatus having a reversible electric motor for selectively adjusting a vehicle seat between predetermined limit positions and to a preselected position therebetween, automatic control means for automatically controlling said motor during return to said preselected position comprising; a housing, a first member rotatably supported in said housing and movable therein upon movement of said seat during adjustment thereof, a second member rotatably mounted in said housing adjacent said first member, said second member being axially movable into engagement with said first member and rotationally movable therewith when so engaged, switch means operatively connected to said second member for automatically controlling said motor for return to said preselected position, and means for effectively connecting and disconnecting said switching means to said motor.

4. In combination with a seat adjuster for a vehicle seat, a power driven adjusting unit comprising; a reversible electric motor having a flexible drive cable drivingly connected thereto for movement in opposite directions, said flexible drive cable operably connecting said motor to said seat adjuster for powering said adjuster unit, a power source, manual switching means and parallel automatic switching means for independently electrically connecting said power source to said motor, a manual switch in series with said automatic means for electrically connecting and disconnecting said automatic means to and from said power source, said automatic switching means having a first member directly connected to and driven by said flexible drive cable and being movable therewith, a second member engageable to and releasable from said first member and being movable therewith when engaged thereto, means including circuit means for controlling the direction of rotation of said motor upon closing of said manual switch and switch means responsive to the direction of movement of said second member for presetting said circuit means to rotate said motor in a direction to move said seat to a favorite position upon command when said seat adjuster has been moved from the favorite position by means of said manual switching means.

5. In combination with a seat adjusting apparatus having a reversible electric motor driving seat adjuster mechanism for selectively adjusting a vehicle seat between predetermined limit positions and automatically, upon command, to a favorite preselected position therebetween, a drive element operably interconnecting said motor and said adjuster mechanism for transmitting torque from said motor to said mechanism, automatic control means for controlling said motor for return to said favorite position comprising; a housing, a gear member rotationally mounted in said housing and operably connected to said drive element for movement therewith, a clutch plate rotationally mounted in said housing adjacent said gear member and axially movable into and from engagement with said gear member and movable therewith when so engaged, means including a compression spring and an electrically energizable solenoid for moving said clutch plate axially into and from engagement with said gear member, means including a pair of switches mounted on said housing and operably contacting said clutch plate, said switches being normally open when said seat is in said favorite position, actuating means on said clutch plate for closing one of said switches when said clutch plate moves in one direction and for closing the other of said switches when said clutch plate moves in the opposite direction, said actuating means being positioned to open both switches when said seat is in said favorite position, an electric circuit controlled by said switches for electrically connecting said power source across said motor, and a manual switch for connecting said circuit to said power source for activating said automatic control means.

6. The invention as claimed in claim 5 wherein said actuating means includes a slot on the periphery of said clutch plate, a pawl slidably bearing on the periphery of said clutch plate and rotatably mounted on said housing for pivotal movement into and out of said slot during rotation of said clutch plate, and a blade secured to said pawl and movable therewith for closing one of said switches when said pawl is pivoted in one direction while moving from said slot and closing the other of said switches when said pawl is pivoted in the opposite direction while moving from said slot and opening both switches when said pawl is in said slot, such pivotal movement of said pawl presetting said electrical circuit for controlling the direction of rotation of said motor for return to said favorite position upon command.

7. The invention as claimed in claim 5 wherein said automatic control means further includes a worm journaled in said housing and in meshing engagement with said gear member, said worm being in series with said drive element for movement therewith, said worm and said gear member having a gear ratio wherein said gear member is rotated less than 360° during movement of said drive element for moving said seat adjuster mechanism between said limit positions.

References Cited by the Examiner
UNITED STATES PATENTS

| | | | |
|---|---|---|---|
| 2,827,105 | 3/1958 | Brundage | 248—394 |
| 2,982,335 | 5/1961 | Garvey | 248—424 |
| 2,983,545 | 5/1961 | Garvey | 296—65 |
| 3,072,231 | 1/1963 | Iding | 248—419 |
| 3,105,670 | 10/1963 | Pickles | 248—420 |
| 3,115,328 | 12/1963 | Brown | 248—429 |

CLAUDE A. LE ROY, *Primary Examiner.*